United States Patent [19]

Rowens, Sr.

[11] Patent Number: 4,926,262

[45] Date of Patent: May 15, 1990

[54] VIEW FINDER BRACKET FOR VIDEO CAMERA

[76] Inventor: Frank J. Rowens, Sr., 310 E. 116th St., Los Angeles, Calif. 90061

[21] Appl. No.: 228,067

[22] Filed: Aug. 4, 1988

[51] Int. Cl.$^5$ ............................................. H04N 5/225
[52] U.S. Cl. .................................... 358/229; 358/224
[58] Field of Search ................... 358/229, 213.13, 224

[56] References Cited

U.S. PATENT DOCUMENTS 4,375,653  3/1983  Staley ................................. 358/229
4,591,250  5/1986  Woodruff ........................... 358/229

FOREIGN PATENT DOCUMENTS 142675  7/1985  Japan .
95783  4/1988  Japan .

Primary Examiner—James J. Groody
Assistant Examiner—Robert M. Bauer
Attorney, Agent, or Firm—Julius Rubinstein

[57] ABSTRACT

The bracket comprises a base portion, one end of the base portion is bent upward defining a wall, the upper end of the wall is bent transverse to the wall extending over the base portion. An adjusting strip is mounted on the upper wall of the base portion and a view finder support is mounted on the adjusting strip. A view finder is mounted on the view finder support. The upper wall of the base portion and the adjusting strip and the view finder support are dimensioned so that the view finder is mounted centrally over the top surface of the video camera.

4 Claims, 1 Drawing Sheet

U.S. Patent                May 15, 1990                4,926,262

VIEW FINDER BRACKET FOR VIDEO CAMERA

This invention relates to a bracket and more particularly to a bracket for use on a video camera.

As video cameras develop technically they employ additional attachments to improve the performance and enjoyment of the video tapes produced by these cameras. For example, some of the more advanced video cameras are provided with character generators so that as the picture is run, legends appear below the picture to explain what is being seen, because in the course of time the memory of the events depicted in the picture is forgotten or becomes hazy.

Figure 1:
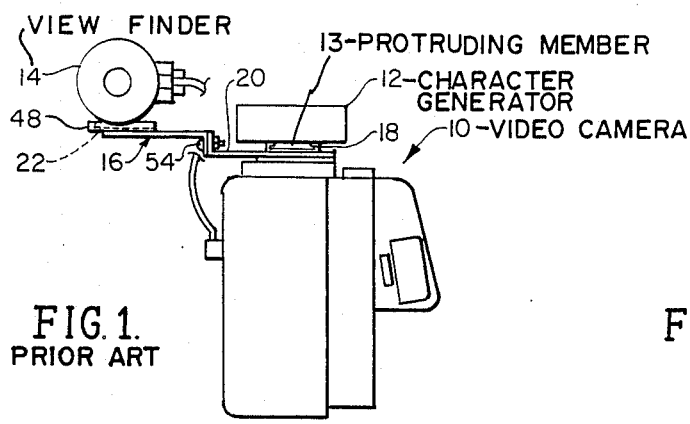

However video cameras have view finders, and when attachments are added, such as character generators, there is a problem in mounting the view finder. Typically the view finder is mounted on a bracket off to the side of the camera as shown in FIG. 1 of the drawing. However with this arrangement, as the person carrying the camera walks along, the view finder strikes walls, or other people, or the person carrying the camera itself, and the view finder and the bracket attaching it to the video camera becomes damaged.

Figure 2:
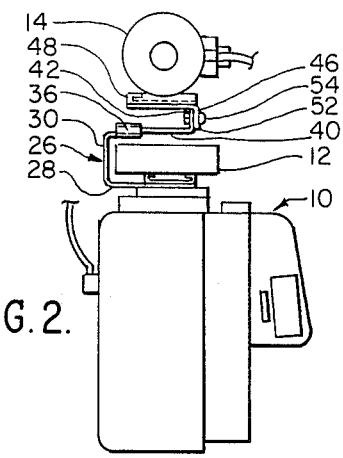

This is shown in the prior art references to Okuma No. 1,389,675, see FIG. 2, Takubo No. 4,407,437, see FIG. 2a, Kee, No. 4,692,807, see FIG. 1, reference numeral 16, Nakatami No. 4,550,343, see FIG. 1, reference numeral 4.

However when a character generator is also mounted on the camera, the problem becomes more complicated, as shown in FIG. 1. In the commercial embodiment shown in FIG. 1, the view finder is off to one side where it is vulnerable to impacts, while the character generator is mounted on the top of the camera.

What is needed therefore, and comprises an important object of this invention, is to provide a bracket for a video camera which is designed so both the character generator and the view finder are mounted on top of the camera and are isolated from accidental blows which could occur if the camera bumped against a wall or some person, and to provide such a bracket comprises an important object of this invention.

Another important object of this invention is to provide an improved bracket which has the same attaching devices as the existing bracket, so the improved bracket can be mounted on the video camera the same way as the prior bracket was mounted, and the attachments such as a view finder and character generator can be mounted on the improved bracket the same way that the attachments were mounted on the prior bracket.

These and other objects of the invention will become more apparent when better understood in the light of the accompanying drawings and specification wherein:

FIG. 1 discloses a video camera now in commercial use and showing the prior bracket arrangement which holds the view finder off to one side in a vulnerable position.

FIG. 2 discloses a video camera using the improved bracket showing the view finder and the character generator mounted one above the other on the improved bracket located on top of the video camera.

Figure 3:
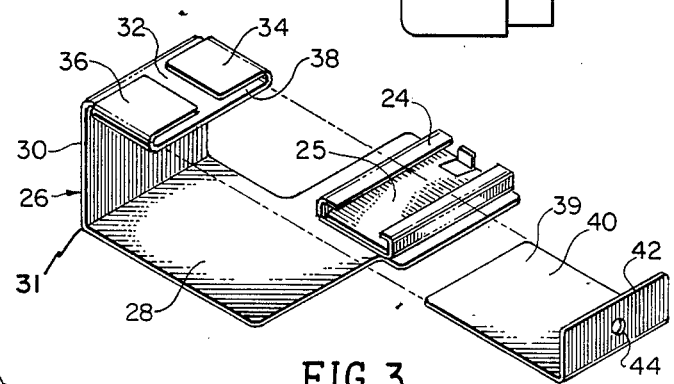

FIG. 3 discloses a perspective view of the lower part of the bracket disclosing an elongated straight slot mounted on the base of the improved bracket for receiving a mounting strip secured to the bottom of the character generator for holding the character generator on the base of the improved bracket.

Figure 4:
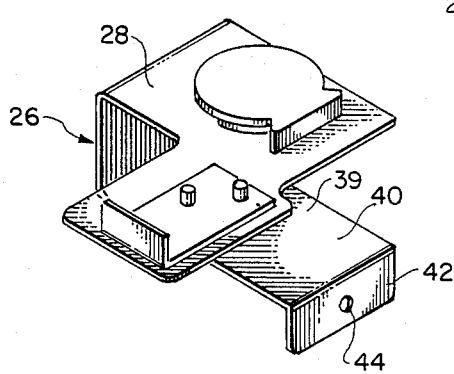

FIG. 4 discloses a bottom perspective view of the improved bracket portion shown in FIG. 3 disclosing a protruding generally circular member on the bottom side of the base of the improved bracket which fits into a correspondingly shaped slot on the top surface of the camera to hold the improved bracket on the camera.

Figure 5:
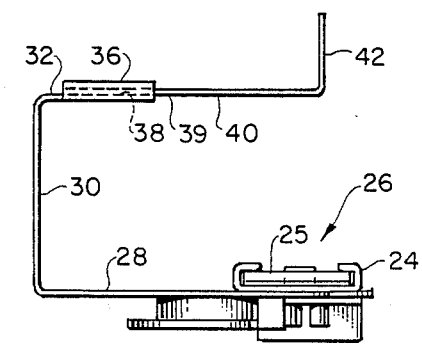

FIG. 5 discloses an elevational view of the improved bracket which is mounted on the top surface of the camera.

Figure 6:
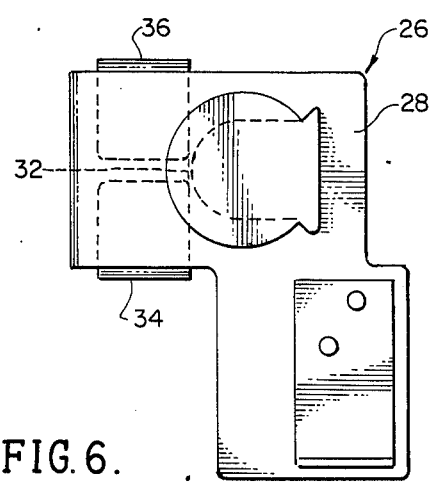

FIG. 6 discloses a bottom view of the improved bracket shown in FIGS. 3 and 5.

Referring now to FIG. 1 of the drawing, a conventional video camera 10 is provided with a character generator 12 and a view finder 14. The prior art bracket 16 is mounted on the top of the video camera 10 and is provided with a straight character generator slot 18 for slidingly receiving a mounting strip 20 attached to the bottom of the character generator 12. The prior art bracket 16 extends transverse to the video camera and is provided with a view finder slot 22, which is shaped to receive a correspondingly shaped protruding member 13 attached to the bottom of the view finder 14 for holding the view finder on the bracket 16.

As shown in FIG. 1, the problem with this arrangement is that the view finder 14 is exposed to impacts against walls or other persons or the person carrying the camera thus making the camera, the view finder and the bracket vulnerable to serious damage.

To overcome this problem an improved bracket 26 is provided as shown in FIGS. 2 through 6. This improved bracket has a base 28 similar to the base of the prior art bracket 16 thus minimizing the expense of redesigning and or manufacturing portions of the bracket. In this way, the improved bracket 26 mounts on the upper surface of the camera 10 in the same way the base of the prior art bracket did.

However the improved bracket 26 differs from the prior art bracket 16 in that it is provided with an upwardly extending wall 30 bent upward at the edge 31 of the base 28. This wall extends upward a distance somewhat greater than the height of the character generator 12 and is bent transverse to wall 30 forming an upper wall 32 extending back toward the opposite edge of the bracket. The configuration of this upper wall 32 has two flange portions 34 and 36. These flange portions are bent toward each other defining a slot 38 for receiving the leg 39 of an adjusting bracket 40.

The adjusting bracket 40 is provided with a transverse mounting flange 42. This mounting flange is provided with a bolt receiving hole 44 which is centrally positioned between the edges of the flanges 34 and 36, when the bracket 40 is slid into place.

A generally L-shaped view finder support 46 is provided, see FIG. 2. The view finder 14 shown in FIG. 1 is provided with a base 48 on the bottom of which is a protuberance 13 shaped to enter a recess or slot 22.

Referring to FIG. 2, the L-shaped view finder support is provided with a downwardly extending transverse flange 52. This flange has a centrally disposed hole through which a bolt 54 extends connecting the L-shaped view finder support 46 to the flange 42 on the adjusting strip 40. Since the adjusting bracket 40 can be restrictively slid in the slot 38, the lateral positioning of the view finder 14 on the top of the camera 10 can be adjusted, the extent of which depends on the length of the leg 39 of the adjusting bracket 40.

The character generator 12 is mounted in the spring loaded channel strip 24 on the base 28 of the improved bracket 26 below the view finder 14 as shown in FIGS. 2, 3, and 5. A flexible flat spring 25 positioned in the channel strip 24 secured the character generator 12 firmly.

With this arrangement the original equipment bracket 16 can be easily and quickly removed from the upper surface of the camera and easily replaced by the improved bracket 26 which has the same mounting structure. Similarly the view finder 14 and the character generator 12 can be easily and quickly removed from the original equipment bracket and mounted on the improved bracket 26 which also has the same mounting structure for these items as the original equipment bracket 16.

However, as seen in FIG. 2, when the character generator 12 and the view finder 14, are mounted on the improved bracket 26, they will be over the upper surface of the camera 10 and protected from harm.

Having described the invention what I claim as new is:

1. A bracket for a video camera comprising a base portion, said base portion having an upper surface and a bottom surface, means on the bottom surface for engaging and locking the base portion of the bracket to the upper surface of the video camera, a wall integral with the base portion bent upward from one end of the base portion a distance greater than the height of any other attachment to be secured to the upper surface of the base portion of the bracket and then bent in a direction extending toward the opposite end of the base thereby defining an upper wall, a view finder support mounted over the upper wall, said view finder support having means for engaging and locking a view finder on the support in upwardly spaced relationship to the base portion of the bracket and above any attachment mounted on the base portion of the video camera.

2. A bracket for a video camera comprising a base portion, said base portion having an upper surface and a bottom surface, means on the bottom surface for engaging and locking the base portion of the bracket to the upper surface of a video camera, a wall integral with the base portion, one end of said wall bent transverse and upward from the base, a character generator, means on the upper surface of the base portion of the bracket for locking the character generator to the upper surface of said base portion, said wall integral with said base portion of said bracket and extending upward a distance greater than the height of the character generator to be secured to the top of the camera, the upper end of said wall bent transverse to said wall and toward the opposite end of the base and defining thereby an upper wall of said base portion, a view finder support mounted over the upper wall, said view finder support having means for engaging and locking a view finder to said support in upwardly spaced relationship above said character generator mounted on the base of the bracket.

3. The bracket described in claim 2 including an adjusting strip mounted on the upper wall of the base portion, said view finder support adjustably mounted on the adjusting strip, whereby the position of said view finder on the adjusting strip and the bracket may be varied.

4. The bracket described in claim 3 including flanges on the upper wall of said base portion, said flanges bent toward each other defining an adjusting strip receiving slot whereby said adjusting strip can be slid into said slot, an upwardly extending flange formed on one end of the adjusting strip, a view finder support, said view finder support having a downwardly extending flange adapted to attached to the upwardly extending flange on said adjusting strip, a view finder mounted on the view finder support whereby the position of said view finder on the video camera can be adjusted by moving said adjusting strip in said slot.

* * * * *